US011551121B2

(12) United States Patent
Horesh et al.

(10) Patent No.: US 11,551,121 B2
(45) Date of Patent: Jan. 10, 2023

(54) METHODS AND SYSTEMS FOR PRIVACY PRESERVING INFERENCE GENERATION IN A DISTRIBUTED COMPUTING ENVIRONMENT

(71) Applicant: INTUIT INC., Mountain View, CA (US)

(72) Inventors: Yair Horesh, Hod Hasharon (IL); Yehezkel Shraga Resheff, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 261 days.

(21) Appl. No.: 17/080,106

(22) Filed: Oct. 26, 2020

(65) Prior Publication Data

US 2022/0129771 A1 Apr. 28, 2022

(51) Int. Cl.

| | |
|---|---|
| ***G06N 5/04*** | (2006.01) |
| ***G06N 5/02*** | (2006.01) |
| ***H04L 67/104*** | (2022.01) |
| ***G06K 9/62*** | (2022.01) |

(52) U.S. Cl.

CPC ............ *G06N 5/04* (2013.01); *G06K 9/6232* (2013.01); *G06N 5/022* (2013.01); *H04L 67/1048* (2013.01); *H04L 67/1057* (2013.01)

(58) Field of Classification Search

CPC ........ G06N 5/04; G06N 5/022; G06K 9/6232; H04L 67/1048; H04L 67/1057

See application file for complete search history.

*Primary Examiner* — Brian Whipple

(74) *Attorney, Agent, or Firm* — Patterson + Sheridan, LLP

(57) ABSTRACT

Certain aspects of the present disclosure provide techniques for performing inferences in a distributed computing environment. An example method generally includes receiving a request to perform an inference with respect to a set of input data. One or more client devices are selected for use in performing the inference with respect to the set of input data. A request to perform the inference is transmitted to the selected one or more client devices. The request generally includes an anonymized, vectorized version of the set of input data such that the selected one or more client devices are to perform the inference based on anonymized data. An inference response is received from each of the selected one or more client devices. An aggregated inference response is generated based on the inference response received from each respective client device of the selected one or more client devices and a reputation score associated with the respective client device, and the aggregated inference response is output to a requesting service.

20 Claims, 8 Drawing Sheets

METHODS AND SYSTEMS FOR PRIVACY PRESERVING INFERENCE GENERATION IN A DISTRIBUTED COMPUTING ENVIRONMENT

INTRODUCTION

Aspects of the present disclosure relate to performing inferences in a distributed computing environment, and more specifically to performing inferences in a distributed computing environment such that privacy of input data against which an inference is performed is preserved.

BACKGROUND

Machine learning models are generally used to perform various inferences against an input data set. For example, machine learning models may be used to classify data into one of a plurality of categories, identify whether input data represents normal or anomalous data, and so on.

In some cases, machine learning models may be trained, at least in part, based on data associated with a user of a device or application for which the machine learning model is to generate inferences. Because of the idiosyncrasies of user data that may be used to train a machine learning model for a specific user, a machine learning model trained on a generic data set or a data set including data from non-representative users may not accurately generate inferences for a given input from the user. To improve the accuracy of inferences generated for the user, machine learning models trained using other data sets (and, in some cases, executed on different computing systems in a distributed computing environment) may be used to also generate inferences for the given input. A result may be generated based on an aggregation of the inferences generated by each machine learning model based on an assumption that a majority, or at least a significant plurality, of machine learning models will generate an inference result that is likely to be accurate. However, because some inferences may be performed based on sensitive data, providing that data to other machine learning models hosted on computing systems for inferencing in the distributed computing environment may compromise the privacy of such data.

Accordingly, techniques are needed to perform inferences in a distributed computing system such that the privacy of the input data against which these inferences are performed is preserved.

BRIEF SUMMARY

Certain embodiments provide a computer-implemented method for performing inferences in a distributed computing system. An example method generally includes receiving a request to perform an inference with respect to a set of input data. One or more client devices are selected for use in performing the inference with respect to the set of input data. A request to perform the inference is transmitted to the selected one or more client devices. The request generally includes an anonymized, vectorized version of the set of input data such that the selected one or more client devices are to perform the inference based on anonymized data. An inference response is received from each of the selected one or more client devices. An aggregated inference response is generated based on the inference response received from each respective client device of the selected one or more client devices and a reputation score associated with the respective client device, and the aggregated inference response is output to a requesting service.

Other embodiments provide a system comprising a processor and a non-transitory computer-readable memory storing instructions that, when executed by the processor, perform an operation for performing inferences in a distributed computing system. The operation generally includes receiving a request to perform an inference with respect to a set of input data. One or more client devices are selected for use in performing the inference with respect to the set of input data. A request to perform the inference is transmitted to the selected one or more client devices. The request generally includes an anonymized, vectorized version of the set of input data such that the selected one or more client devices are to perform the inference based on anonymized data. An inference response is received from each of the selected one or more client devices. An aggregated inference response is generated based on the inference response received from each respective client device of the selected one or more client devices and a reputation score associated with the respective client device, and the aggregated inference response is output to a requesting service.

Still further embodiments provide a computer-implemented method for performing inferences in a distributed computing system. An example method generally includes receiving a request to perform an inference with respect to a set of input data. A local inference response is generated based on the set of input data, wherein the inference response includes a confidence value for the local inference response. One or more client devices to be used in performing the inference are selected based, at least in part, on the confidence value for the local inference response. A request to perform the inference is transmitted to the selected one or more client devices. The request generally includes an anonymized, vectorized version of the set of input data such that the selected one or more client devices are to perform the inference based on anonymized data. An inference response is received from each of the selected one or more client devices. An aggregated inference response is generated based on a confidence score associated with the inference response received from each respective client device of the selected one or more client devices and a reputation score associated with the respective client device, and the aggregated inference response is output to a requesting service.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
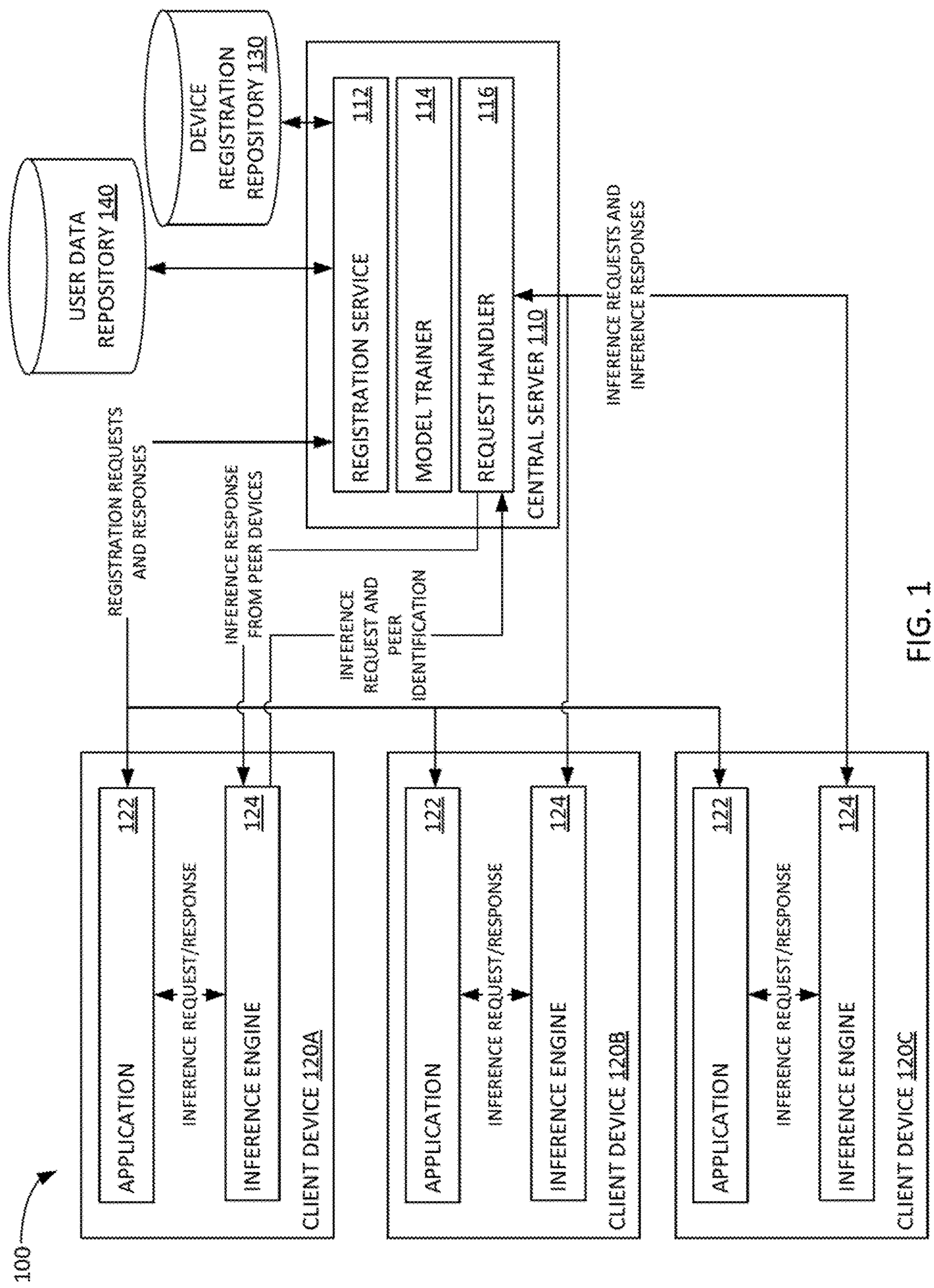
FIG. 1 depicts an example distributed computing environment in which inferences are performed.

Distributed computing systems generally allow for tasks to be performed by multiple computing devices in the distributed computing system. By allowing multiple devices to perform a task, or a part of a task, additional computing resources may be leveraged to allow for various improvements to the performance of computing tasks.

For example, distributed computing may allow for faster performance of computing tasks by distributing portions of a task to different computing devices for performance in parallel. In another example, distributed computing may allow for improved accuracy of results generated in the performance of a computing task. For example, computing tasks, such as the generation of predictions, classifications, or the like using machine learning models, may be somewhat nondeterministic when the machine learning models are trained using different training data sets. By performing inferences using machine learning models parameterized differently via local training or training using unique data sets, the results from each of these different machine learning models may be aggregated, and the accuracy of the aggregated result generated from the individual results from each of the plurality of machine learning model may be more accurate, or more likely to be accurate, than the result of an inference performed by any particular machine learning model executing on a computing device in a distributed computing system.

While distributed computing systems may allow for improved performance in the accuracy at which computing tasks (e.g., the performance of inferences using various machine learning models) may be performed, the generation of some inferences may be based on personally identifiable information (PII) or other sensitive information for which privacy may be an important consideration. In distributed computing environments where, for example, a trusted entity controls all of the computing devices across which a computing task may be distributed, it may be assumed that the privacy of the data may be preserved. However, in many computing environments, the privacy of data shared amongst computing devices in order to execute a computing task may not be guaranteed, as computing systems may be subject to various attacks that, if successful, may result in exfiltration or other misuse of sensitive data. For example, in a distributed computing environment where multiple end-user devices can participate in executing a computing task, a compromise at any single end-user device may result in leakage of sensitive data.

Aspects of the present disclosure provide techniques for distributing the performance of computing tasks against an input data set in a manner that preserves the privacy of the input data. Generally, a plurality of computing devices registered with a central service may be selected to perform an inference on a set of input data. The privacy of the input data may be preserved in various manners such that the selected computing devices may not be able to extract sensitive data from the set of input data that is received for use in performing the inference. For example, the input data may be anonymized so that specific textual content is replaced with generic textual content, specific numbers are replaced by ranges of numbers, specific dates are replaced with more generic day indicators, and the like. Further, inferences may be delayed such that the input data on which an inference is to be performed is not received substantially at the time the input data is generated. Further, each selected computing device may receive the input data and request to perform the inference in such a manner that the identity of the requesting device is anonymized, which may further reduce a likelihood that sensitive data can be extracted, associated with a particular user or computing device, and exfiltrated or otherwise compromised. Thus, aspects of the present disclosure may allow for federating inference performance across different computing devices using machine learning models trained using different training data sets, which may improve the accuracy of inferences generated for an input data set, while also maintaining the privacy and security of the input data on which such inferences are performed.

Example Privacy Preserving Inference Generation in a Distributed Computing Environment FIG. 1 illustrates an example distributed computing environment 100 in which inference operations may be distributed across a plurality of end-user devices, such as desktop computers, laptop computers, tablet computers, smartphones, or the like, such that the privacy of the data used as an input into a machine learning model that generates the inference is preserved.

As illustrated, computing environment 100 includes a central server 110 and a plurality of client devices 120A-120C (collectively 120). Generally, as discussed in further detail below, client devices that participate in privacy preserving inference generation in the distributed computing environment 100 (e.g., 120A-120C) can register with the central server 110 and receive a trained machine learning model to use in performing inferences (or a data set that the client device 120 can use to train a machine learning model) based on a generic set of training data and user-specific data stored in a user data repository 140. When a client device 120A determines that an inference is to be performed using other client devices 120 in the computing environment 100, the client device 120A can dispatch inference requests to one or more other client devices 120 through the central server 110, receive inference responses from the one or more other client devices 120, and generate an aggregate inference response from the individual inference responses generated by the one or more other client devices 120.

Central server 110 generally maintains a registry of client devices (e.g., 120A-120C) that can participate in the generation of an inference for combination into an aggregated inference from an input and routes inference requests, including an anonymized copy of the input data on which an inference is to be generated, from a client device (e.g., 120A) to one or more other client devices (e.g., 120B-C)

specified by client device 120A for processing. The client devices 120B-C specified by client device 120A may generate inferences without being aware of the identity of the requesting client device 120A, as an identifier of the client device 120A may appear to the client devices 120B-C as a random number or random string from which information such as an Internet Protocol address or a Medium Access Control (MAC) address cannot be recovered. Further, the client devices 120B-C may not be able to recover the underlying input data, as specific information in the anonymized copy of the input data may have been replaced by client device 120A with anonymized data, such as generic text phrases or ranges of values instead of specific values, thereby preserving the privacy of information used to generate the inference response. As illustrated, central server 110 includes a registration service 112, a model trainer 114 and a request handler 116.

Registration service 112 generally registers client devices (e.g., 120A-120C) for use in inference generation in a distributed computing environment.

Generally, when application 122 is installed or otherwise deployed on a client device (e.g., 120A), application 122 may transmit a registration request to the registration service 112 requesting that the client device 120A be enrolled in the distributed computing environment. The registration request received from the client device 120A may include device identifier information identifying the client device 120A for use in routing inference requests to the client device. The device identifier information for the client device 120A may include, for example, a telephone number (e.g., for devices that include cellular radio devices, such as smartphones or cellular-enabled tablet computers) associated with the client device 120A, a media access control (MAC) address of the client device 120A, or other unique identifier that can be used to route requests to the client device 120A. In response to receiving the registration request from the client device 120A, registration service 112 can generate a unique identifier for the client device 120A for use in routing requests to the appropriate client device. To maintain privacy within the computing environment 100, the generated unique identifier for the client device 120A may be an identifier from which the device identifier information cannot be retrieved. For example, the generated unique identifier for the client device 120A may include a hashed version of the device identifier information generated using a one-way hashing algorithm (e.g., SHA, MD5, etc.).

To enroll a client device, registration service 112 can add an entry into a device routing table that associates the device identifier information for the client device 120A with the generated unique identifier for the client device 120A. For example, suppose that a client device 120A with the MAC address 70-40-BB-43-B3-79 transmits a request to enroll with central server 110. Registration service 112 can generate a unique identifier that prevents other devices from obtaining identifying information for the client device 120A using a hash algorithm or other one-way function. For example, using the SHA256 algorithm, registration service 112 can generate a unique multi-bit identifier for the client device 120A that can be treated as a random number by a receiving client device 120. The mapping between the MAC address and the generated unique identifier for the client device 120A may be written to device registration repository 130 for use in dispatching requests and responses within the computing environment 100, as discussed in further detail below. Additionally, to allow client devices 120B-C to transmit inference requests to client device 120A via central server 110, registration service 112 may broadcast a message to the client devices 120B-120C in computing environment 100 when client device 120A registers with central server 110. The broadcast message may include the generated identifier for the client device 120A, and, as discussed in further detail below, a client device 120B-C can use the generated identifier to transmit inference requests to the client device 120A via central server 110.

After registration service 112 registers client device 120A, registration service 112 may request that model trainer 114 train a machine learning model (e.g., an inference engine 124) which registration service 112 can deploy to client device 120A. The machine learning model trained by registration service 112 to inference engine 124 may be one of a variety of models that may be used by a client device 120 to generate an inference. For example, model trainer 114 can train one of a variety of classification models, such as a neural network model, logistic regression model, or the like, using a training data set generated for each client device 120, and deploy the trained machine learning model to each client device 120, as discussed in further detail below.

In some aspects, model trainer 114 can train the machine learning model using a training data set that includes, at least in part, synthetic data records that may be representative of data points that are likely to be encountered in real-life operations. For example, in a transaction processing system in which machine learning models are used to classify transactions, the synthetic data records may be sample transactions that are associated with one or more tags identifying a type of the transaction. The description of each transaction in each of the synthetic data records may use words in a white list of general phrases or words, such as a dictionary including words that do not include private names, family names, numbers, or uncommon phrases that may be linked to a specific user.

In some aspects, the training data set may be augmented with user-specific data associated with a user of a specific client device for training a machine learning model to be deployed to that specific client device. That is, model trainer 114 can generate a training data set for client device 120A using the synthetic data records and user-specific data associated with a user of client device 120A retrieved from user data repository 140; similarly, model trainer 114 can generate a training data set for client device 120B using the synthetic data records and user-specific data associated with a user of client device 120B retrieved from user data repository 140, and so on. The user-specific data may include real-life transactions recorded by a specific user of a client device (e.g., real-life transactions recorded by a user of client device 120A for the training data set generated for client device 120A; real-life transactions recorded by a user of client device 120B for the training data set generated for client device 120B, and so on). By including user-specific data in the training data set, registration service 112 may generate unique training data sets for each client device 120 in the computing environment 100, which may result in each client device 120 generating inferences using differently trained machine learning models.

Because the machine learning model deployed to each client device 120A-120C may be trained using different data sets, each client device 120A-120C may generate inferences for an input data set differently. When uniquely trained models deployed to each client device 120 agree, for example, on a classification, it may be assumed that the classification is a correct classification, since differently trained machine learning models have generated the same inference. In contrast, differing inferences generated by the client devices 120A-120C may indicate uncertainty in which inference is actually accurate, and, as discussed in further detail below, a weighted majority vote may be used to identify a most likely inference.

In some aspects, registration service 112 need not train a machine learning model and deploy the machine learning model to the client device 120A as part of the registration process. In such a case, registration service 112 may generate the training data set, as discussed above, and transmit the generated training data set to client device 120A. In response, inference engine 124 at client device 120A may train (or re-train) the machine learning model using the training data set and indicate, to the registration service 112, when training is complete and thus when the client device 120A is ready to accept inference requests from other client devices 120 in the computing environment 100.

Request handler 116 generally receives requests from a client device (e.g., 120A) for one or more specified client devices 120 to perform inferences on an input data set and routes requests and responses to the appropriate client device 120 for processing. The one or more specified client devices 120 may generally be considered peer devices to the client device 120A in the computing environment 100. The request received from client device 120A may include a vector having the anonymized input data on which an inference is to be performed, as well the generated unique identifiers for the client device(s) 120 that are to perform an inference for the requesting client device 120A (as identified in the request received from client device 120A). To route the requests to the appropriate client devices, request handler 116 can look up device addresses or other routing information in device registration repository 130 associated with the generated unique identifiers included in the request and transmit the request to the devices associated with the generated unique identifiers included in the request. In some aspects, to further preserve the privacy within computing environment 100, request dispatcher 116 may be configured to delay dispatch of requests to the client devices 120B-120C to mitigate the potential for timing correlation attacks or other attacks from exposing the identity of the client device 120A.

In response, request handler 116 receives inference responses from the client devices 120B-120C, processes the responses, and transmits the responses to the requesting client device 120A. Inference responses received from the client devices 120B-120C may include an inference generated for an input data vector and the generated unique identifier for the requesting client device 120A (which may be included in the inference request transmitted to the client devices 120B-120C). Using the information stored in device registration repository 130, request dispatcher can identify the address of the requesting client device 120A and transmit the inference responses to the requesting client device 120A. In some aspects, request handler 116 may forward inference responses to the requesting client device 120A as inference responses are received from the client devices 120B-120C.

In some aspects, to minimize network overhead, request handler 116 may wait for inference responses to be received from each of client devices 120B-120C. Once an inference response is received from each of client devices 120B-120C, request dispatcher 116 can transmit the inference responses from client devices 120B-120C to the requesting client device 120A in a single transmission. In some aspects, the request received from a requesting client device 120A may indicate whether the client has requested real-time forwarding of inferences or batch forwarding of inferences. The request handler 116 may forward inferences to the requesting client device 120A based on the indication.

Client devices 120A-120C are representative of end-user computing devices that may participate in distributed inference generation in computing environment 100. As illustrated, each client device 120A-120C may include an application 122 and an inference engine 124.

Application 122 is generally representative of an application through which a user can record data (e.g., a transaction record) and request that an inference be performed in respect of the recorded data.

Application 122 can record data through various techniques. For example, the application 122 may record data that may be used as an input into an inference engine 124 using manual user input, receipt of a transaction record from another device, by extracting information from an image of a document, or the like. In some aspects, after application 122 ingests or otherwise receives information identifying a transaction or other data against which an inference is to be performed, application 122 can transmit an inference request to inference engine 124. In response, application 122 can receive an aggregated inference response generated based on the inference responses provided to inference engine 124 by one or more other client devices 120B-120C in computing environment 100 and use the aggregated inference response as appropriate.

Inference engine 124 is generally uses a trained machine learning model stored in a model or parameter repository (not depicted) to generate inferences for a set of input data. Generally, inference engine 124 generates inferences for a set of input data upon receipt of an inference request from request handler 116 at central server 110 or directly from an application 122. When an inference request is received from an application 122, inference engine 124 can request the execution of inferences for the set of input data by other client devices 120B-120C by transmitting a request to request dispatcher 116 at central service 110 for those client devices to perform an inference. When an inference response is received from request dispatcher 116 at central server 110, inference engine 124 can generate an inference response for the set of input data and transmit the generated inference response to the request dispatcher 116 for dispatch to the requesting client device.

Generally, inference engine 124 may locally perform an inference on the set of input data and use the results of the locally performed inference, in part, to determine a number of client devices that are to also perform an inference on the set of input data. The inference engine 124 may generate, for a given set of input data, an inference and a confidence level for the generated inference. Inference engine 124 may determine a number of client devices 120 from which performance of an inference is to be requested based on the confidence level for the inference generated by the inference engine 124. Generally, the number of client devices from which performance of an inference is to be requested may increase as the confidence level for the inference generated by the inference engine 124 decreases. For example, the number of client devices from which performance of an inference is to be requested may be represented by the equation: numDevices=round((1−confidenceLevel)*n), where n represents a number of devices to be used when the inference engine 124 has no confidence in the inference generated by inference engine 124. Thus, in this example, if inference engine 124 generates an inference with a confidence level of 0.5, the number of devices from which performance of an inference is to be requested may be 0.5n; in another example, if inference engine 124 generates an inference with a confidence level of 0.9, the number of devices from which performance of an inference is to be requested may be 0.1n.

In some aspects, a situation may exist where the number of client devices 120 in the distributed computing environment is less than n. In such a case, inference engine 124 may select up to n other client devices 120 from which performance of an inference is to be requested. For example, suppose, n=10, but only 8 other client devices exist in the distributed computing environment. For inferences having a confidence level from 0.2 through 1.0, the number of client devices may be determined according to the equation: numDevices=round((1−confidenceLevel)*n); however, for inferences having a confidence level below 0.2, the number of client devices from which performance of an inference is to be requested may be eight (i.e., the number of other client devices that exist in the distributed computing environment). In some aspects, n may be dynamically adjusted up to a maximum value as client devices register and/or de-register with the registration service 112 at central server 110.

In some aspects, a threshold confidence level may be used in determining whether a distributed inference is to be performed. If the confidence score of the locally performed inference exceeds the threshold confidence level, inference engine 124 need not request the performance of an inference from other client devices 120 in the distributed computing environment.

After inference engine 124 determines the number of devices from which performance of an inference is to be requested, inference engine 124 may select that number of devices from a set of devices that have been enrolled at client server 110 for use in performing inferences in the computing environment 100. In some aspects, inference engine 124 may randomly select that number of devices from the set of client devices enrolled at client server 110.

In some aspects, inference engine 124 at one client device (e.g., 120A) may maintain reputation scores for each client device (e.g., 120B-120C) enrolled with client server 110 and select the devices based on the reputation scores associated with each client device. Generally, inference engine 124 at a client device 120 may maintain a list of other client devices that are registered with registration service 112 at central server 110. The list may include the identifiers generated by the registration service 112 for each client device and, in some aspects, a reputation score associated with each client device. Generally, when inference engine 124 receives a notification from registration service 112 that a new client device has registered with the registration service 112, inference engine 124 can assign a base reputation score to the new client device and adjust the reputation score of the new client device as the new client device performs inferences for and on behalf of the client device 120A.

In one example, a list of client devices may be sorted in descending order, and inference engine 124 can select the client devices at the top of the sorted list (corresponding to client devices having the highest reputation scores) for use in generating an inference for the input data set. After selecting the client devices 120B-120C to be used in generating an inference for the input data set, inference engine 124 can transmit an inference request to request handler 116 including the identifiers of the selected client devices 120B-120C.

In some aspects, inference engine 124 may delay transmitting the inference request for a set amount of time such that inferences are performed on stale data, which may reduce the likelihood that timing correlation attacks or other attacks may be used to identify the user of the client device 120A for which client devices 120B-120C are to perform an inference.

To further preserve the privacy of the input data on which the selected client devices 120B-120C perform inferences, inference engine 124 can add noise to the input data set such that the vector representing the input data set does not exactly match the input data set. In some aspects, the noise added to the input data set may change the input data set by a small amount, which may be defined a priori for each type of data on which an inference is to be performed, so that the exact input data generated at a client device 120A is not received by the selected client devices 120B-120C.

In some aspects, other techniques may be used to preserve the privacy of the input data on which the selected client devices 120B-120C perform inferences. For example, timing data may be transformed from an exact date and time (e.g., a UNIX timestamp) to a first value identifying a day of the week and a second value identifying a time window during the day at which a transaction was performed. In another example, exact values of data may be replaced with range indicators indicating a range of values within which a data point falls. In still further examples, inference engine 124 can modify the input data set so that the input data set includes only words or values that appear in a whitelisted set of terms that are common across users within the computing environment 100. Generally, anonymizing the input data set may result in less precise data being exchanged with the selected client devices 120B-C. While performing inferences using anonymized input data may decrease the accuracy of inferences generated by the machine learning models executing on the selected client devices 120B-C, the decrease in inference accuracy may be considered an acceptable tradeoff in order to maintain the privacy of the underlying data on which an inference is to be performed. Further, decreases in inference accuracy may be minimized by using small range windows so that similar input data is categorized similarly, even after the input data is anonymized.

In response, inference engine 124 receives inference responses from the selected client devices via request dispatcher 116 at central server 110. Inference engine 124 may then generate an aggregated inference response based on the inference generated by the inference engine 124 and the inference responses received from the selected client devices (e.g., 120B and/or 120C in this example).

To generate the aggregated inference response, the inference engine 124 can, for example, generate a score for each unique inference response and select the unique inference response having a highest generated score as the aggregated inference response. The score may be generated based, at least in part, on the confidence score associated with an inference response received from each of the selected client devices 120B-120C. In some aspects, the score may further be generated based on a reputation score associated with each of the selected client devices, which may give additional weight to inference responses generated by the selected client devices that have consistently generated accurate inferences and may decrease the importance of inference responses generated by client devices that do not consistently generate accurate inferences.

For example, suppose that inference engine 124 has requested that five other client devices perform an inference on a given vector of input data (e.g., representing a transaction record to be classified), and the inference responses are as follows:

TABLE 1

Example Responses, Confidence Levels, and Reputation Scores Used in Generating an Aggregated Inference Response

| Device | Response | Confidence Level | Reputation Score |
|---|---|---|---|
| A (host device) | 123 | 0.95 | 1.05 |
| B | 123 | 0.86 | 1.12 |
| C | 234 | 0.77 | 0.95 |
| D | 123 | 0.92 | 1.01 |
| E | 234 | 0.85 | 0.99 |

Inference engine 124 may thus determine that two unique inference responses exist and may calculate a score for inference response "123" and inference response "234". The score for each inference response may be represented by the equation:

$$inferenceResponseScore = \sum_{k=1}^{n} confidenceLevel_k * reputationScore_k$$

where n represents the number of devices that generated a particular inference response. For the example illustrated in Table 1, inference engine 124 can generate the inference response score for inference response "123" as (0.95*1.05)+(0.86*1.12)+(0.92*1.01)=2.8899 and can generate the inference response score for inference response "234" as (0.77*0.95)+(0.85*0.99)=1.573. Based on these inference response scores, inference engine 124 can determine that "123" is the most likely inference response for a given input into the inference engine 124 and return the inference response "123" as the aggregated inference response for the inference request.

In some aspects, inference engine 124 can determine the accuracy of the inference response generated by each respective client device based on a similarity of the inference response generated by the respective client device to inference responses generated by other client devices of the selected one or more client devices. Generally, an inference response can be determined to be accurate if the inference response is in a majority of the inference responses received from the selected set of client devices. The determined accuracy may be used, for example, to adjust the reputation scores for each respective peer device, as discussed in further detail below.

In some aspects, after identifying an inference response, inference engine 124 may modify the reputation scores of the devices from which inference responses were received. Generally, each device may start with an inference score of 1 when the device is enrolled, which indicates that responses generated by a device are neither weighted more heavily (due to a history of generating accurate inferences) nor penalized (due to a history of generating inaccurate inferences). An adjustment factor may be applied to the reputation score of each device based on whether a device generated an inference that matched the aggregated inference response. For example, devices that generate an inference that matches the aggregated inference response may receive a reputation score adjustment of +m, while devices that generate an inference that does not match the aggregated inference response may receive a reputation score adjustment of −m. Using the example illustrated above with respect to Table 1, and supposing that m=0.01, the reputation scores for devices A, B, and D may be adjusted to 1.06, 1.13, and 1.02, respectively, to reflect that these devices generated an inference response that was accepted as the aggregated inference response. Meanwhile, the reputation scores for devices C and E may be adjusted to 0.94 and 0.98, respectively, to reflect that these devices generated an inference response that was not accepted as the aggregated inference response.

In some aspects, inference engine 124 may present each of the unique inference responses to a user of application 122 for approval. If a user of application 122 indicates that an inference response other than the identified inference response (i.e., the inference response having the highest inference response score) is the correct response, inference engine 124 can reverse the previous modifications made to the reputation scores of the devices from which inference responses were received. The reputation scores for devices that generated inference responses other than the user-indicated inference response may be adjusted by −m, and the reputation scores of devices that generated the user-indicated inference response may be adjusted by +m.

In some aspects, inference engine 124 may remove client devices (e.g., 120B and/or 120C) from the set of client devices from which an inference response may be requested as new client devices enroll (or register) with central server 110 or as the reputation scores of client devices change.

For example, if, after an inference is performed, inference engine 124 determines that the reputation score of client device 120C has fallen below a threshold (which may be defined, for example, as a reputation score, a ranking within a group of client devices, or the like), inference engine 124 may remove client device 120C from the set of client devices from which an inference response may be requested.

In another example, when a new client device enrolls with central server 110 (triggering receipt, at client device 120A, of a notification of such enrollment from registration service 112), inference engine 124 may determine whether to remove client devices from the set of client devices from which an inference response may be requested. Client devices may be removed, for example, if the reputation score of a client device is less than a threshold score when a new client device enrolls with central server 110 or may be removed to maintain a set of client devices with a constant size. Generally, each client device 120A-120C may independently maintain its own set of client devices from which an inference response may be requested.

In some aspects, inference engine 124 at client device 120A may modify the reputation scores associated with each registered client device (e.g., 120B-120C) over time. A decay factor d may, for example, be applied periodically to decrease the reputation score of a client device if no inference response has been received from the client device within a set amount of time. Generally, by applying a decay factor to the reputation score associated with each registered client device, inference engine 124 can reduce the reputation score for such client devices to account for the fact that these client devices have not been used recently, and thus that inference engine 124 has less confidence in the accuracy of inference responses generated by client devices that have not recently participated in inference generation in computing environment 100 for the client device 120A.

In some aspects, inference engine 124 may be configured to train and/or retrain the machine learning models used to perform inferences in the computing environment 100. Generally, inference engine 124 may receive (e.g., in a configuration provided by central server 110) the synthetic data set discussed above and may retrieve, from user data repository 140, additional records to use in training or retraining the machine learning model. Inference engine 124 may anonymize the data included in the records retrieved from user data repository 140 prior to generating a training data set from the anonymized records and the synthetic data set and training or retraining the machine learning model based on the generated training data set.

Generally, because inference engine 124 may be configured to perform inferences based on a vector representing an anonymized input data set, inference engine 124 may not be able to recover the underlying data on which the inference is performed. That is, because inference engine 124 may receive noisy data or data for which specific data is replaced by more generic data, inference engine 124 may not have enough information to recover the specific data from the generic data. Further, inference engine 124 may be configured to discard the vector representing the set of input data after generating an inference response and providing the inference response to the requesting application or service. By performing inferences for an anonymized set of input data and by discarding the vector after generating an inference response, the privacy of the underlying data for which an inference is generated may be preserved, as the vector may be retained in memory only temporarily and may be represented as a random set of numbers or range values (instead of the actual underlying data) while in memory.

Figure 2:
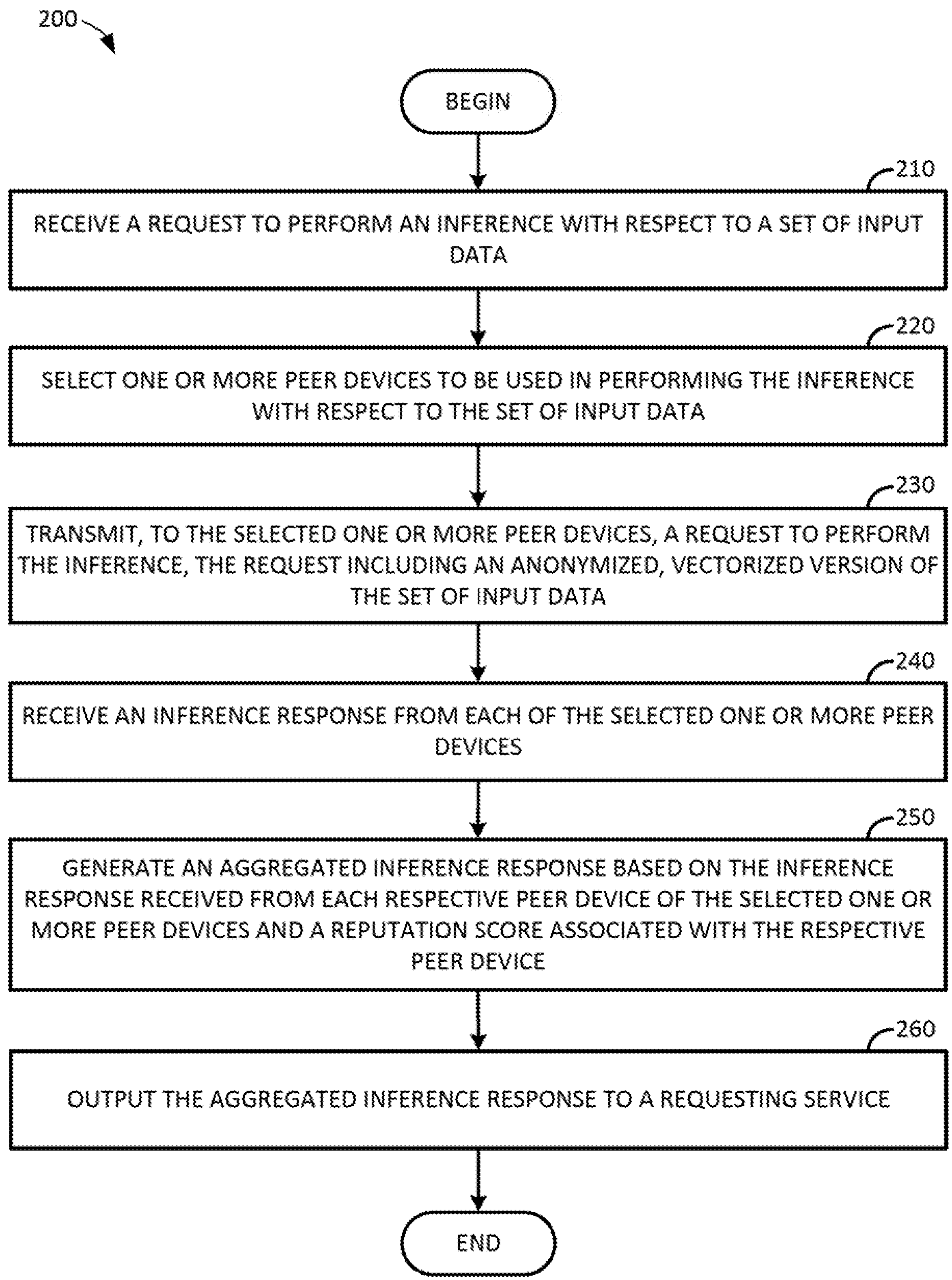
FIG. 2 illustrates example operations for performing an inference in a distributed computing environment such that the privacy of the data on which the inference is performed is preserved.

Example Computer-Implemented Method for Privacy Preserving Inference Generation in a Distributed Computing Environment FIG. 2 illustrates example operations 200 for generating inferences in a distributed computing environment in a manner that preserves the privacy of the underlying data on which the inference is generated. The operations described herein may be performed, for example, by an inference engine executing on a client device in a distributed computing environment (e.g., inference engine 124 on a client device 120 illustrated in FIG. 1).

As illustrated, operations 200 begin at block 210, where a system receives a request to perform an inference with respect to a set of input data. The system can receive the request to perform an inference with respect to a set of input data from a requesting service, for example, when input data is received through user input, from another computing system, or otherwise ingested (e.g., via optical character recognition (OCR)-based extraction of information from an image of a document). The request to perform an inference with respect to a set of input data may include, for example, a request to classify the set of input data into one of a plurality of categories. The requesting service may be, for example, an application or service executing locally to the inference engine or an application or service executing on a remote computing system to which the system is connected.

At block 220, the system selects one or more client devices to be used in performing the inference with respect to the set of input data. The system can select one or more devices to be used in performing the inference based on a list of devices that are enrolled with a central server as candidate devices that can participate in a distributed inference generation procedure within a distributed computing environment. The system can select the one or more devices randomly, based on reputation scores, in a round robin fashion, or the like. In some aspects, the system can select the one or more devices to be used in performing the inference with respect to the set of input data based on a confidence level of an inference performed by the system with respect to the input data set.

At block 230, the system transmits, to the selected one or more client devices, a request to perform the inference. The request may include an anonymized, vectorized version of the set of input data. Generally, to transmit the request to perform the inference, the system may transmit an inference request to a request dispatcher at a central server including the anonymized and vectorized version of the set of input data and unique identifiers associated with the selected one or more client devices. The unique identifiers associated with the selected one or more client devices may be unique identifiers assigned to the selected one or more client devices by the central server when the selected one or more client devices registered with the central server as client devices within the computing environment. The unique identifier assigned to each of the selected one or more client devices may be an identifier from which personally identifying information, such as a phone number or MAC address, cannot be retrieved so that data privacy is maintained within the computing environment.

At block 240, the system receives an inference response from each of the selected one or more client devices. The inference response received from each of the selected one or more client devices may include, for example, an inference generated by a client device (e.g., a category to which the input data set belongs) and a confidence level associated with the inference.

At block 250, the system generates an aggregated inference response. The aggregated inference response may be generated based on the inference response received from each respective client device of the selected one or more client devices and a reputation score associated with the respective client device. In some aspects, the aggregated inference response may further be generated based on a locally-generated inference response. For example, to generate an aggregated inference response, the system can identify each unique inference response received from the selected one or more client devices. For each unique inference response (e.g., category to which the input data set belongs), the system can generate an inference response score based on the confidence level generated for the inference response by each client device and a reputation score associated with the client device. The system may select the unique inference response with the highest score as the aggregated inference response.

At block 260, the system outputs the aggregated inference response to a requesting service. The aggregated inference response may be output to another application executing on the system or to an application executing on a remote computing system.

Figure 3:
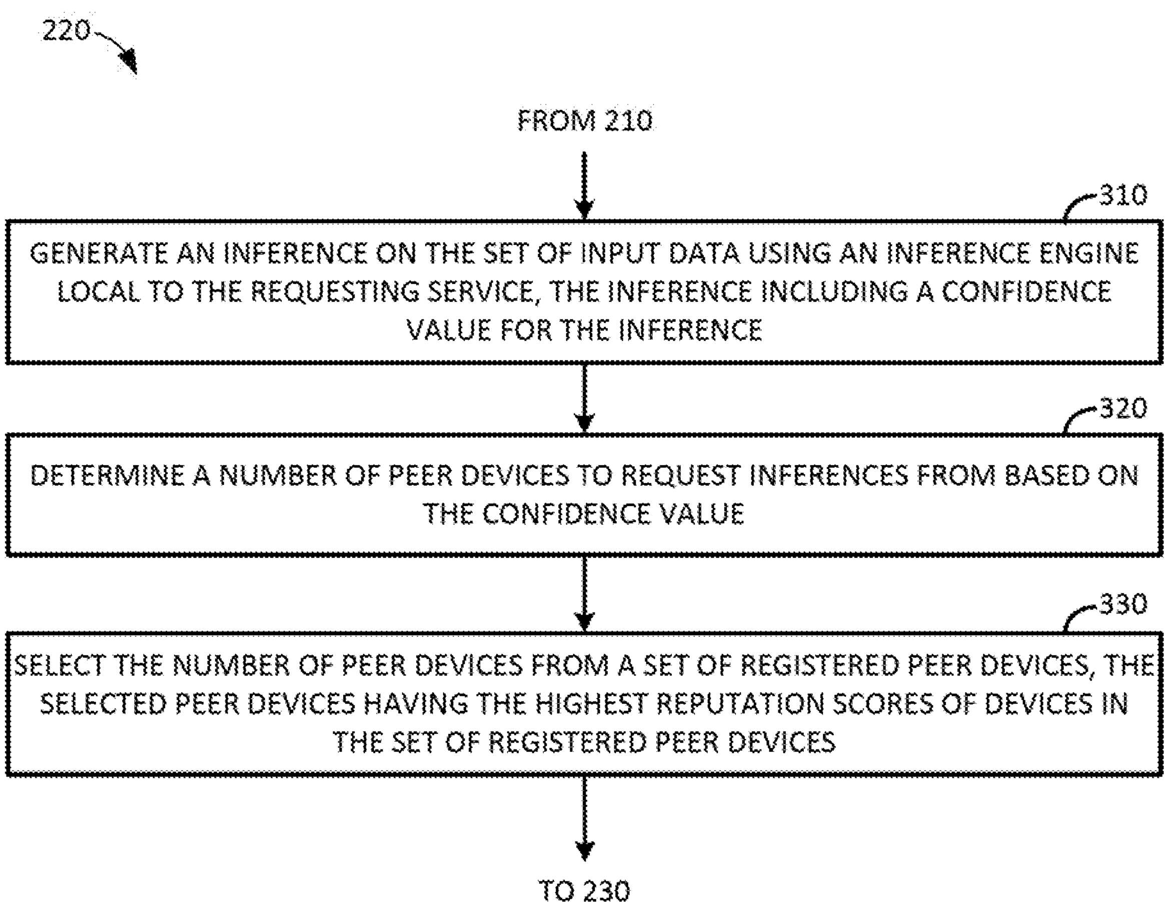
FIG. 3 illustrates example operations for selecting client devices to be used in performing an inference in a distributed computing environment.

FIG. 3 illustrates further details of block 220 illustrated in FIG. 2 in which one or more client devices are selected to be used in performing an inference with respect to a set of input data, in accordance with certain aspects.

As illustrated, operations 220 may begin at block 310, where the system generates an inference on the set of input data using an inference engine local to the requesting service. The generated inference may include a confidence value for the inference. The confidence value generally represents an amount of confidence that the inference engine local to the requesting service has in the inference generated for the set of input data.

At block 320, the system determines a number of client devices to request inferences from based on the confidence value. The number of client devices may be inversely proportional to the confidence value for the inference such that the number of client devices increases as the confidence value approaches zero and the number of client devices decreases as the confidence value approaches one. The number of client devices may increase as the confidence value approaches zero because the inference engine may not be certain of the accuracy of the generated inference, and thus, additional data may be needed for the inference engine to have a higher degree of confidence in the inference result that may be eventually generated for the set of input data. For inferences having confidence values that approach one, the number of client devices needed to confirm the inference may be relatively small, as the inference engine may not need as much information to confirm that the generated inference is accurate.

At block 330, the system selects the number of client devices from a set of registered (or enrolled) client devices. The selected client devices may be the number of client devices with the highest reputation scores of devices in the set of registered client devices. In some aspects, where multiple client devices have a same reputation score, any number of these client devices may be included in the selected number of client devices. For example, the system may select one device at random for each unique reputation score in the set of registered client devices. In another example, where a number x of client devices are to be selected, the system may sort the set of client devices based on reputation score (if not already sorted) and may select the first x devices in the sorted set of client devices. Subsequently, operations may proceed to block 230 illustrated in FIG. 2, discussed above.

Figure 4:
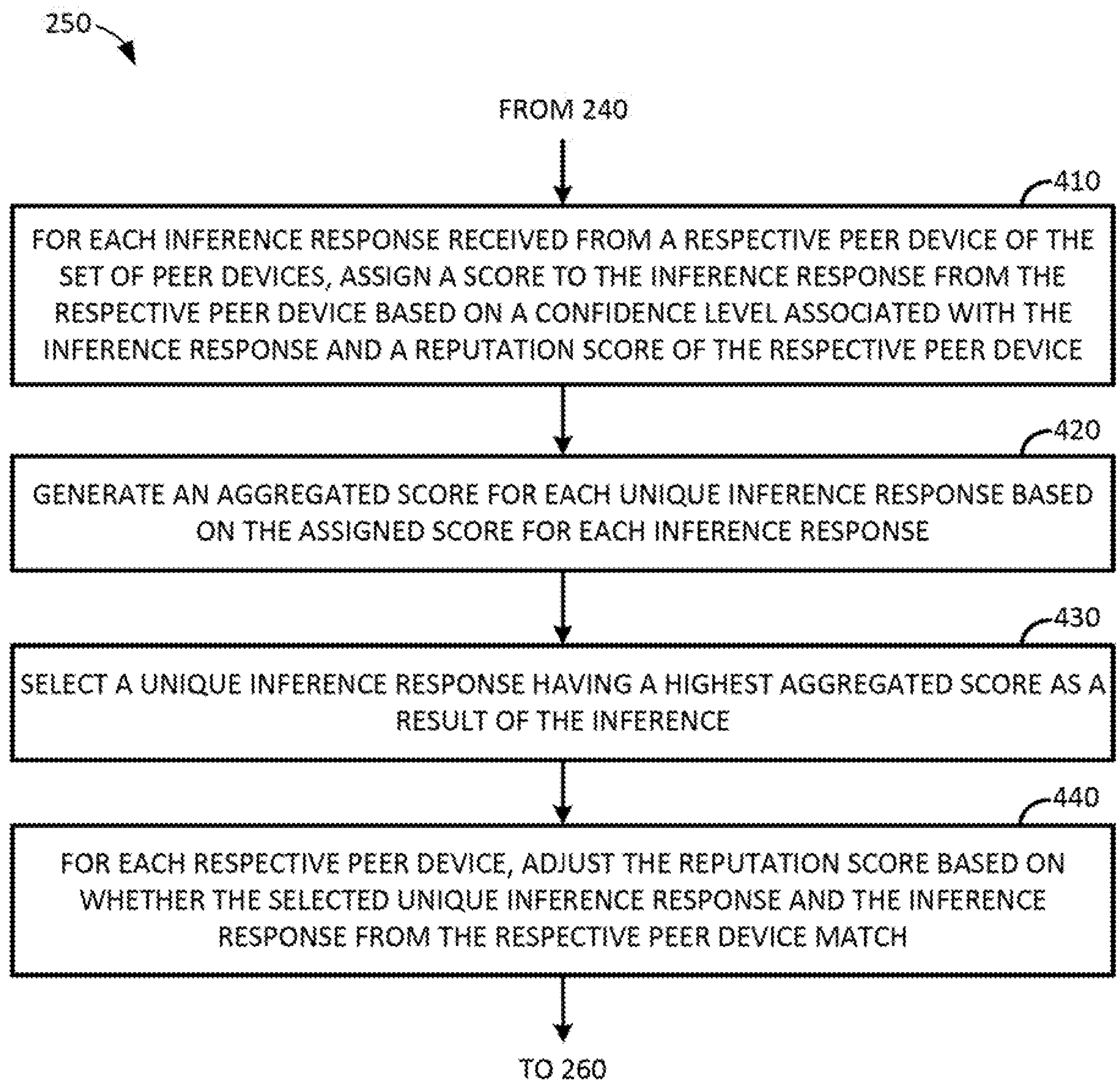
FIG. 4 illustrates example operations for generating an aggregated inference response based on inference responses from each client device in a set of selected client devices for performing an inference in a distributed computing environment.

FIG. 4 illustrates further details of block 250 illustrated in FIG. 2 in which an aggregated inference response is generated, in accordance with certain aspects described herein.

As illustrated, block 250 starts at block 410, where the system assigns a score to the inference response received from each respective client device in the set of client devices. The score assigned to the inference response may be based, for example, on a confidence level associated with the inference response and a reputation score of the respective client device. For example, the score assigned to each inference response may be the confidence level associated with the inference response, weighted by the reputation score of the respective client device. By doing so, the confidence level associated with the inference response may be adjusted to a higher score where a client device has a history of generating accurate inferences; meanwhile, the confidence level associated with the inference response may be adjusted to a lower score where a client device has a history of inconsistently generating accurate inferences or not generating accurate inferences so that these inferences are not as heavily weighted when generating the aggregated inference response.

At block 420, the system generates an aggregated score for each unique inference response based on the assigned score for each inference response. The aggregated score for each unique inference response may be calculated based on the sum of the assigned score for each inference response matching the unique inference response. Generally, the aggregated score for each unique inference response may represent a weighted vote of the set of client devices, where each client device contributes a vote that is weighted based on the confidence score generated by each client device and the reputation of each client device.

At block 430, the system selects a unique inference response from the set of unique inference responses as a result of the inference. The selected unique inference response may be the unique inference response having a highest aggregated score as a result of the inference.

At block 440, the system adjusts the reputation score for each respective client device in the set of client devices. Generally, the reputation score may be adjusted based on whether the selected unique inference response and the inference response from each respective client device matches. Where the selected unique inference response and the inference response from a client device match, the reputation score of the client device may be increased by an amount m. The amount m may be added to the reputation score or may otherwise be used as a scaling factor to increase the reputation score of the client device. Likewise, where the selected unique inference response and the inference response from a client device do not match, the reputation score of the client device may be decreased by an amount m.

Figure 5:
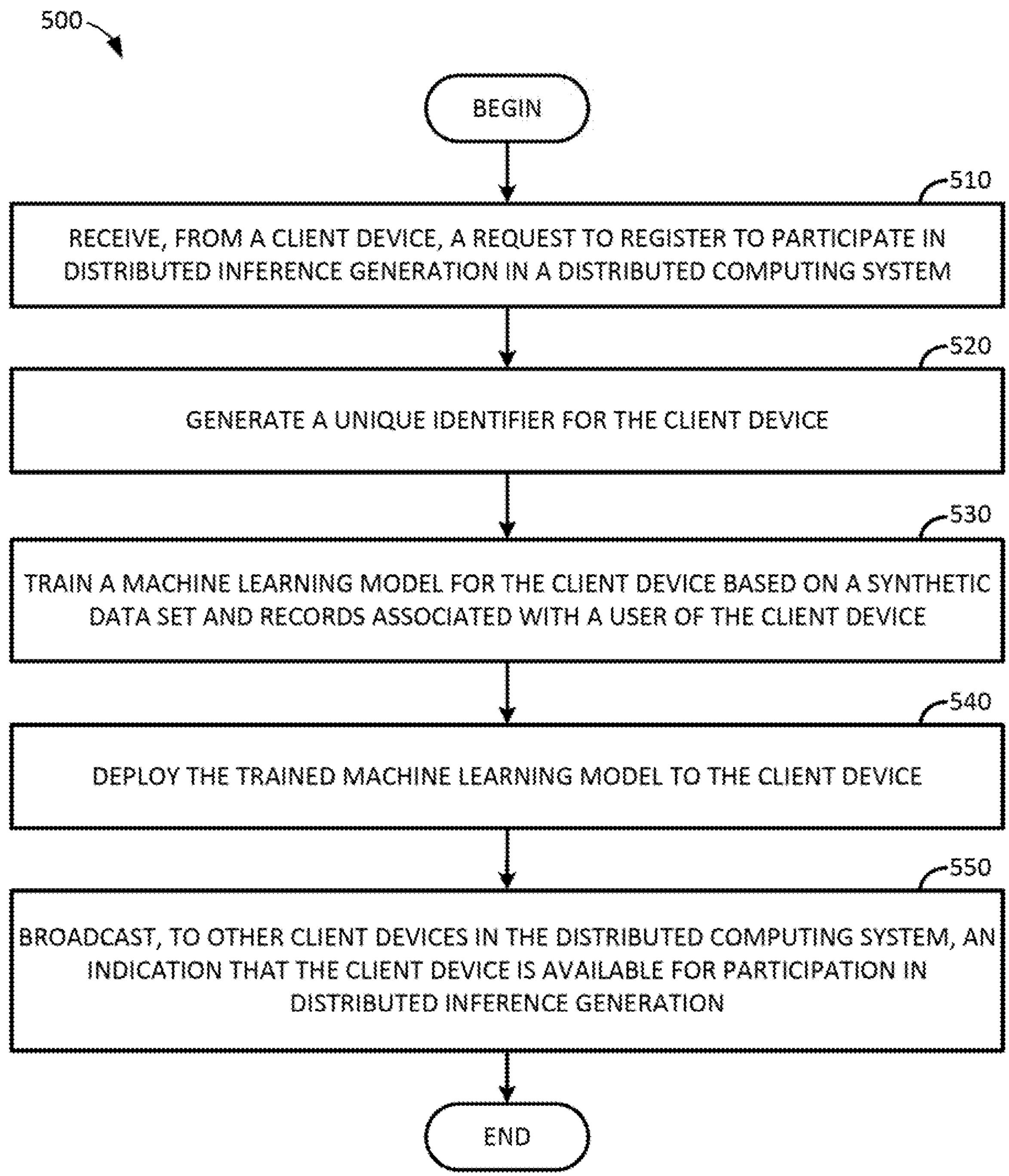
FIG. 5 illustrates example operations for registering a client device to participate in privacy preserving inference generation in a distributed computing environment.

Example Computer-Implemented Method for Registering Devices that Participate in Privacy Preserving Inference Generation in a Distributed Computing Environment FIG. 5 illustrates example operations 500 that may be performed to register a client device to participate in privacy preserving inference generation in a distributed computing environment. Operations 500 may be performed, for example, by a central server in a distributed computing environment (e.g., central server 110 illustrated in FIG. 1).

As illustrated, operations 500 may begin at block 510, where the central server receives, from a client device, a request to register to participate in distributed inference generation in a distributed computing system. The request may generally include information identifying the client device and information identifying a user of the client device. The information identifying the client device may include, for example, a telephone number, a MAC address, an IP address, or other identifying information that can be used to route communications to the client device. The information identifying the user of the client device may be, for example, a user name, a user ID, or other information identifying a user of an application executing on the client device.

At block 520, the central server generates a unique identifier for the client device. To generate the unique identifier, the central server can use a one-way function, such as a hashing function, to generate a unique identifier from the information identifying the client device received in the request to register to participate in distributed inference generation in the distributed computing system. After the unique identifier is generated, the central server can update a routing table to associate the unique identifier with the identifying information received in the request for use in routing requests to the appropriate client device.

At block 530, the central server trains a machine learning model for the client device. The machine learning model may be trained based on a synthetic data set and records associated with a user of the client device. The synthetic data set may be, for example, a data set including synthetic data records that may be representative of data points that are likely to be encountered in real-life operations, and the synthetic data set may be combined with a subset of records associated with the user of the client device. The subset of the records associated with the user of the client device may be, for example, randomly selected records from the records associated with the user of the client device, or records having timestamps within a set amount of time from a time at which the request to register to participate in distributed inference generation was received. Generally, by training a machine learning model based on a synthetic data set and records associated with a user of the client device, unique machine learning models may be trained for each client device in the distributed computing environment so that common inference results can be determined to be accurate due to the generation of common results using differently trained models.

At block 540, the central server deploys the trained machine learning model to the client device.

At block 550, the central server broadcasts, to other client devices in the distributed computing system, an indication that the client device is available for participation in distributed inference generation. The indication may include the unique identifier for the client device, but generally does not include the information identifying the client device received in the request at block 510, so that other client devices are unable to unmask or otherwise discover and communicate directly with the device associated with the unique identifier.

Figure 6:
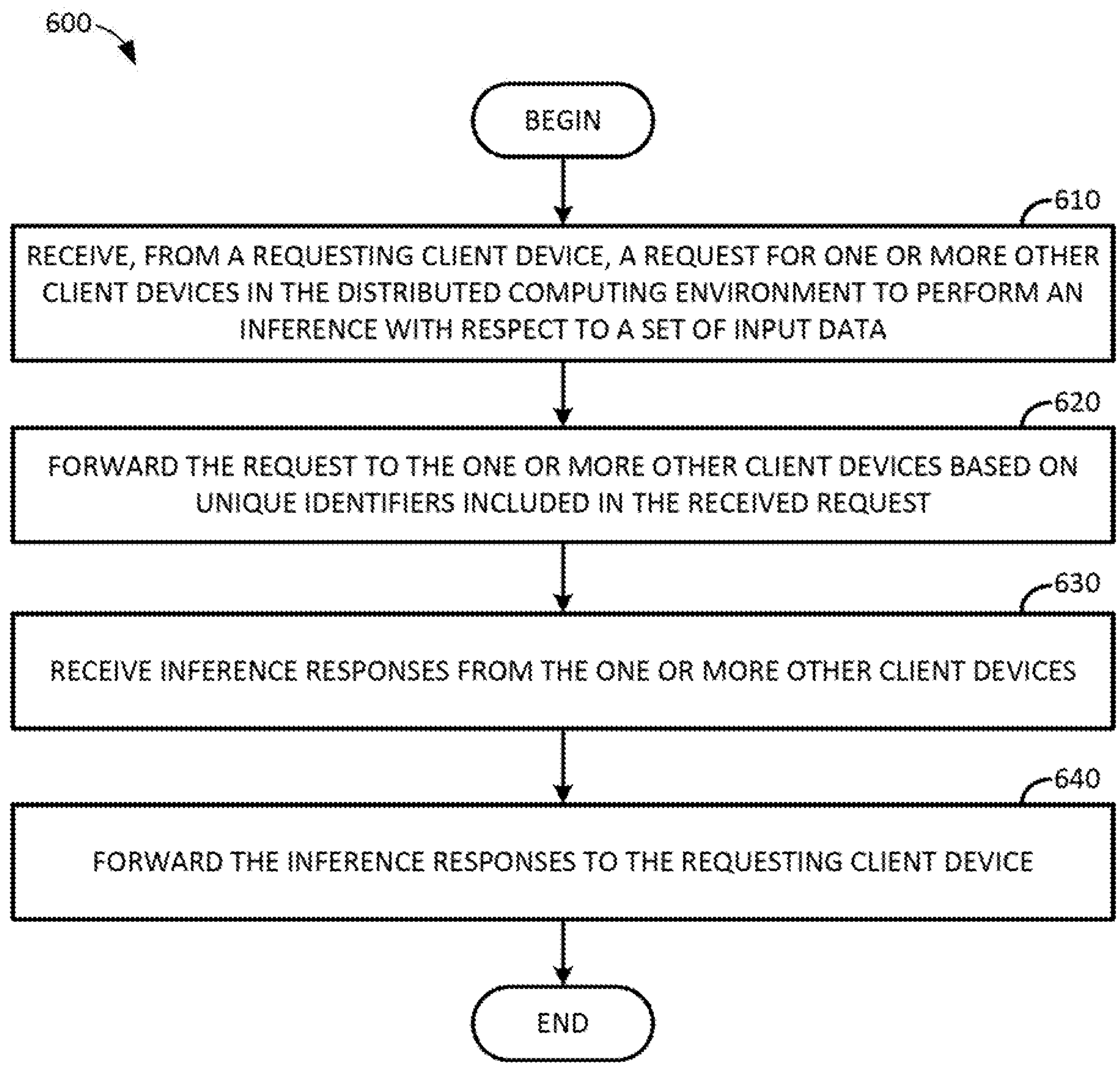
FIG. 6 illustrates example operations for handling requests for specified client devices in a distributed computing environment to perform inferences on behalf of a requesting client device.

FIG. 6 illustrates example operations 600 that may be performed to handle requests for specified client devices in a distributed computing environment to perform inferences on behalf of a requesting client device. Operations 600 may be performed, for example, by a request handler at a central server in the distributed computing environment (e.g., request handler 116 of central server 110 illustrated in FIG. 1).

As illustrated, operations 600 may begin at block 610, where the request handler receives, from a requesting client device, a request for one or more other client devices in the distributed computing environment to perform an inference with respect to a set of input data. The request generally includes a list of unique identifiers associated with the one or more other client devices that the request handler can use to route the requests to the appropriate client devices. The request also includes an input data set on which inferences are to be performed. Generally, the input data set may be an anonymized vector in which identifiable information has been replaced by the requesting client device with anonymized information, such as ranges of values, generic descriptions, or other information from which the actual underlying input data cannot be recovered.

At block 620, the request handler forwards the request to the one or more other client devices based on unique identifiers included in the received request. The request generally includes the unique identifier of the requesting client device, which the one or more other client devices may be expect to return in their respective inference responses so that inference responses can be routed back to the requesting client device through the request handler.

At block 630, the request handler receives inference responses from the one or more other client devices. The inference responses generally include the unique identifier of the requesting client device, an inference, and a confidence score associated with the inference.

At block 640, the request handler forwards the inference responses to the requesting client device. The inference responses may be forwarded to the requesting client device as they are received at the request handler or may be queued for batch transmission to the requesting client device.

Figure 7:
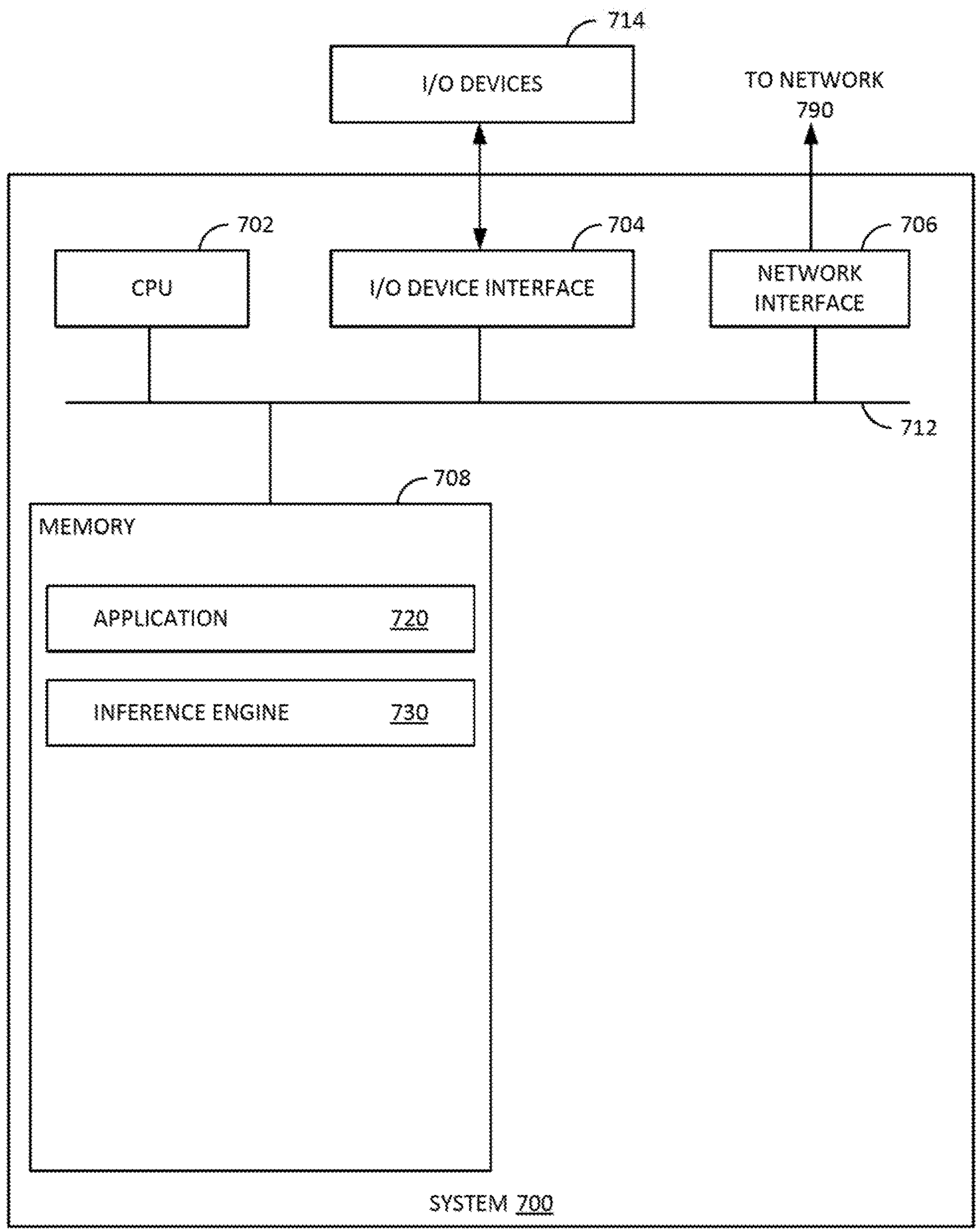
FIGS. 7 and 8 illustrate an example systems on which embodiments of the present disclosure can be performed.

Example Systems for Privacy Preserving Inference Generation in a Distributed Computing Environment FIG. 7 illustrates an example system 700 that can generate inferences in a distributed computing system in such a manner that preserves the privacy of input data used to generate the inferences. For example, system 700 may comprise a client device 120 illustrated in FIG. 1.

As shown, system 700 includes a central processing unit (CPU) 702, one or more I/O device interfaces 704 that may allow for the connection of various I/O devices 714 (e.g., keyboards, displays, mouse devices, pen input, etc.) to the system 700, network interface 706 through which system 700 is connected to network 790 (which may be a local network, an intranet, the internet, or any other group of computing devices communicatively connected to each other), a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 707, memory 708, and storage 710.

CPU 702 is included to be representative of a single CPU, multiple CPUs, a single CPU having multiple processing cores, and the like.

Memory 708 is representative of a volatile memory, such as a random access memory, or a nonvolatile memory, such as nonvolatile random access memory, phase change random access memory, or the like. As shown, memory 708 includes an application 720 and an inference engine 730. Application 720 may correspond to application 122 illustrated in FIG. 1 and is generally representative of an application through which a user can record data (e.g., a transaction record) and request that an inference be performed in respect of the recorded data. System 700 can register as a peer device that can participate in distributed inference generation in a distributed computing environment by transmitting a registration request to a remote registration service (e.g., via network interface 706) and receive a trained machine learning model to deploy to inference engine 730 or data to use in training a machine learning model used by inference engine 730 to perform inferences on request.

Inference engine 730 may correspond to inference engine 124 illustrated in FIG. 1 is generally configured to generate inferences based on an input data set. In cases where inference engine 730 receives a request to perform an inference on behalf of a requesting client device from a central server (e.g., via network interface 706), inference engine 730 can generate an inference response and transmit the generated inference response to the central server for dispatch to the requesting client device. In cases where inference engine 730 is executing on the requesting client device, inference engine 730 can select a number of peer devices to use in generating an inference response and transmit a request to the central server for dispatch. The request may include an anonymized and vectorized version of the input data on which an inference is to be performed and the central server-generated unique identifiers of the selected peer devices. In response, the inference engine 730 may receive inference responses from the selected peer devices through the central server, generate an aggregated response based on the received inference responses from the selected peer devices, and output the aggregated response to the requesting application 720 for further use.

Figure 8:
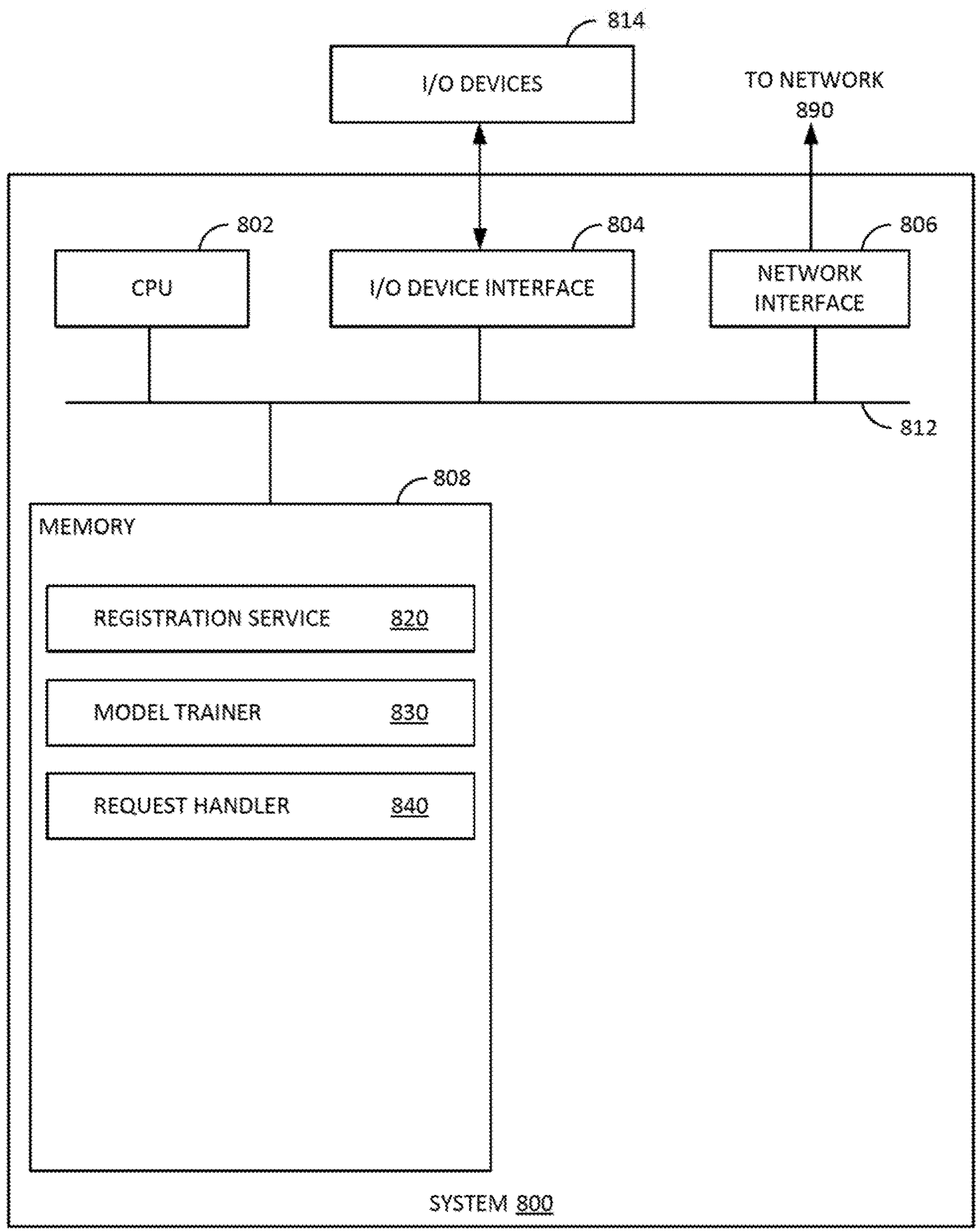

FIG. 8 illustrates an example system 800 that can register client devices and route requests to generate inferences in a distributed computing system in such a manner that preserves the privacy of input data used to generate the inferences. For example, system 800 may comprise a central server 110 illustrated in FIG. 1.

As shown, system 800 includes a central processing unit (CPU) 802, one or more I/O device interfaces 804 that may allow for the connection of various I/O devices 814 (e.g., keyboards, displays, mouse devices, pen input, etc.) to the system 800, network interface 806 through which system 800 is connected to network 890 (which may be a local network, an intranet, the internet, or any other group of computing devices communicatively connected to each other), a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 808, memory 808, and storage 810.

CPU 802 is included to be representative of a single CPU, multiple CPUs, a single CPU having multiple processing cores, and the like.

Memory 808 is representative of a volatile memory, such as a random access memory, or a nonvolatile memory, such as nonvolatile random access memory, phase change random access memory, or the like. As shown, memory 808 may include a registration service 820, model trainer 830, and request handler 840. Registration service 820 may correspond to registration service 112 illustrated in FIG. 1 and may be configured to handle requests to register client devices as devices that can participate in distributed inference generation in the distributed computing environment. Generally, registration service 820 receives requests including identifying information for a client device and generates a unique identifier from the received identifying information such that a client device is unable to communicate directly with other client devices in the distributed computing system and discover sensitive information about the client devices in the distributed computing system. After registering a client device, registration service 820 can broadcast a message to the client devices in the distributed computing environment indicating that a new client device is available for use in performing inferences in the distributed computing environment.

Model trainer 830 may correspond to model trainer 114 illustrated in FIG. 1 and generally generates a training data set for a client device and trains a machine learning model for the client device based on the generated training data set. To generate the training data set, model trainer 830 can aggregate a synthetic data set with a subset of the records associated with a user of the client device being registered at system 800. The model trainer 830 can train the machine learning model based on the generated training data set and deploy the trained model to the associated client device for use in performing inferences on behalf of other client devices in the distributed computing environment.

Request handler 840 may correspond to request handler 116 illustrated in FIG. 1 and generally handles receipt and transmission of inference requests and inference responses in the distributed computing environment. Generally, request handler 840 receives, from a requesting client device, a request for other client devices to perform an inference on an anonymized input data set. Request handler 840 forwards the request to the other client devices in the distributed computing environment, receives inference responses from the other client devices, and forwards the received inference responses to the requesting client device for further processing, as discussed above.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. §112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for performing inferences by a device in a distributed computing system, comprising:

receiving a request to perform an inference with respect to a set of input data;

selecting one or more peer devices to be used in performing the inference with respect to the set of input data;

transmitting, to the selected one or more peer devices, a request to perform the inference, wherein the request includes an anonymized, vectorized version of the set of input data such that the selected one or more peer devices perform the inference based on anonymized data;

receiving an inference response from each of the selected one or more peer devices;

generating an aggregated inference response based on the inference response received from each respective peer device of the selected one or more peer devices and a reputation score associated with the respective peer device; and outputting the aggregated inference response to a requesting service.

2. The method of claim 1, further comprising: performing the inference on the device, wherein the aggregated inference response is further based on an inference response generated by the device.

3. The method of claim 2, wherein the inference response generated by the device is generated based on a model trained using synthetic data provided by a service provider in the distributed computing system and user data associated with a user of the device.

4. The method of claim 2, wherein:

the inference response generated by the device includes a confidence value for the inference response, and selecting the one or more peer devices comprises selecting a number of peer devices based on the confidence value.

5. The method of claim 1, further comprising: for each respective peer device of the selected one or more peer devices, adjusting the reputation score associated with the respective peer device based on an accuracy of the inference response generated by the respective peer device.

6. The method of claim 5, further comprising: determining the accuracy of the inference response generated by the respective peer device based on a similarity of the inference response generated by the respective peer device to inference responses generated by other peer devices of the selected one or more peer devices.

7. The method of claim 1, further comprising: for each respective peer device of the selected one or more peer devices, modifying the reputation score associated with the respective peer device based on a time elapsed from a most recent inference generated by the respective peer device.

8. The method of claim 1, wherein selecting the one or more peer devices comprises selecting a number of peer devices having reputation scores exceeding a threshold reputation score.

9. The method of claim 1, wherein selecting the one or more peer devices comprises randomly selecting peer devices from a list of registered peer devices.

10. The method of claim 1, further comprising:
prior to selecting the one or more peer devices:
determining that a reputation score for a peer device has degraded below a threshold score; and
removing the peer device from a list of registered peer devices from which the one or more peer devices may be selected.

11. The method of claim 1, further comprising:
registering as a peer device with a central server; and
receiving requests to perform inferences from other devices in the distributed computing system subsequent to registering as a peer device with the central server.

12. The method of claim 1, wherein the request includes an identifier of the device in the distributed computing system, the identifier comprising randomly generated data from which a network address of the device cannot be retrieved.

13. The method of claim 1, further comprising: generating the anonymized, vectorized version of the set of input data by replacing specific data in the set of input data with ranges of data within which the specific data lies.

14. The method of claim 1, further comprising: generated the anonymized, vectorized version of the set of input data by replacing data in the set of input data with terms included in a whitelisted set of terms common across users within the computing environment.

15. A system, comprising:
a processor; and
a memory having instructions stored thereon which, when executed by the processor, performs an operation for performing inferences by a device in a distributed computing system, the operation comprising:
receiving a request to perform an inference with respect to a set of input data;
selecting one or more peer devices to be used in performing the inference with respect to the set of input data;
transmitting, to the selected one or more peer devices, a request to perform the inference, wherein the request includes an anonymized, vectorized version of the set of input data such that the selected one or more peer devices perform the inference based on anonymized data;
receiving an inference response from each of the selected one or more peer devices;
generating an aggregated inference response based on the inference response received from each respective peer device of the selected one or more peer devices and a reputation score associated with the respective peer device; and
outputting the aggregated inference response to a requesting service.

16. The system of claim 15, wherein the operation further comprises:
performing the inference on the device, wherein the aggregated inference response is further based on an inference response generated by the device, wherein:
the inference response generated by the device includes a confidence value for the inference response, and
selecting the one or more peer devices comprises selecting a number of peer devices based on the confidence value.

17. The system of claim 15, wherein the operation further comprises: for each respective peer device of the selected one or more peer devices, adjusting the reputation score associated with the respective peer device based on an accuracy of the inference response generated by the respective peer device.

18. The system of claim 15, wherein the operation further comprises: for each respective peer device of the selected one or more peer devices, modifying the reputation score associated with the respective peer device based on a time elapsed from a most recent inference generated by the respective peer device.

19. The system of claim 15, wherein the operation further comprises:
prior to selecting the one or more peer devices:
determining that a reputation score for a peer device has degraded below a threshold score; and
removing the peer device from a list of registered peer devices from which the one or more peer devices may be selected.

20. A method for performing inferences by a device in a distributed computing system, comprising:
receiving a request to perform an inference with respect to a set of input data;
generating a local inference response on the device based on the set of input data, wherein the local inference response includes a confidence value for the local inference response;
selecting one or more peer devices to be used in performing the inference with respect to the set of input data based, at least in part, on the confidence value for the local inference response;
transmitting, to the selected one or more peer devices, a request to perform the inference, wherein the request includes an anonymized, vectorized version of the set of input data such that the selected one or more peer devices perform the inference based on anonymized data;
receiving an inference response from each of the selected one or more peer devices;
generating an aggregated inference response based on a confidence score associated with the inference response received from each respective peer device of the selected one or more peer devices and a reputation score associated with the respective peer device; and outputting the aggregated inference response to a requesting service.

* * * * *